UNITED STATES PATENT OFFICE.

JOHN BOWMAN AND GRAHAM KLINCK, OF PRINCEVILLE, ILLINOIS.

COMPOUND FOR ROOFING.

SPECIFICATION forming part of Letters Patent No. 257,544, dated May 9, 1882.

Application filed March 11, 1882. (No specimens.)

*To all whom it may concern:*

Be it known that we, JOHN BOWMAN and GRAHAM KLINCK, of the village of Princeville, in the county of Peoria and State of Illinois, have invented certain new and useful Improvements in Compounds for Roofing; and we do hereby declare that the following is a full, clear, and exact description thereof.

In carrying out the invention we first make a composition of the following ingredients and proportions to one hundred pounds, and in the following manner: Brimstone, five pounds; rosin, ten pounds, and mix hot. Then take flour-paste, made with strong alum-water, twenty pounds; coal-tar, sixty-five pounds, and mix cold. Mix these two compounds together over a slow fire until thoroughly dissolved and intermingled. Pour off in casks, ready for use.

To prepare this composition for use take composition, one hundred pounds; plastering-hair, one-half pound, and mix thoroughly, and then add screened gravelly sand one hundred pounds. To this add slowly plaster-of-paris, (previously mixed dry) twenty-five pounds, and stir constantly. When it is of the consistency of mortar spread quickly, while hot, on the roof with plastering-trowel. When cool roll with a heavy iron roller. After rolling take equal parts of composition and coal-tar, heat them together, and while hot add to every gallon of this mixture three quarts of plaster-of-paris, and apply as a skin-coat.

As thus prepared the composition is valuable for roofing, furnishing a fire-proof and water-tight covering which is not liable to crack, and when worn can easily be mended. A fresh coat of tar from time to time will keep it in proper condition. It can be applied to flat or steep roofs, and does not affect the rain-water, nor emit any odor after the first month.

This composition can be made of different degrees of consistency, from that of butter to that of a stone. For roofs it should be about like beeswax. It can be used for other purposes, for sidewalks, aqueducts, &c., when it should be made harder.

Having described our invention, what we claim, and desire to secure by Letters Patent, is—

1. The herein-described composition of matter to be used for roofs, &c., consisting of the following proportions, to wit: brimstone, five pounds; rosin, ten pounds; coal-tar, sixty-five pounds; flour-paste, made with alum-water, twenty pounds, mixed and prepared as set forth.

2. A roofing-cover consisting of brimstone, rosin, flour and alum-water paste, coal-tar, hair, and plaster-of-paris, combined and applied as set forth.

In testimony that we claim the foregoing as our own we do hereto set our signatures in presence of two witnesses.

JOHN BOWMAN.
GRAHAM KLINCK.

Witnesses:
PETER AUTEN,
ODILLON B. SLANE.